United States Patent [19]

Shibayama et al.

[11] 4,231,097
[45] Oct. 28, 1980

[54] APPARATUS FOR CALCULATING A PLURALITY OF INTERPOLATION VALUES

[75] Inventors: Shigeki Shibayama; Kazuhide Iwata; Nobuo Okuda, all of Yokohama, Japan

[73] Assignee: Tokyo Shibaura Denki Kabushiki Kaisha, Japan

[21] Appl. No.: 967,420

[22] Filed: Dec. 7, 1978

[30] Foreign Application Priority Data

Dec. 12, 1977 [JP] Japan ............... 52/148171

[51] Int. Cl.³ ............................. G06F 15/42
[52] U.S. Cl. ........................ 364/577; 364/414; 364/723; 250/445 T
[58] Field of Search ............. 364/723, 527, 414, 577, 364/300; 250/445 T

[56] References Cited
U.S. PATENT DOCUMENTS

| 3,720,813 | 3/1973 | Badessa | 364/577 X |
| 3,725,684 | 4/1973 | Panschow | 364/723 |
| 3,748,447 | 7/1973 | Hajicek et al. | 364/723 |
| 3,840,174 | 10/1974 | Craft | 364/577 |
| 3,905,045 | 9/1975 | Nickel | 364/300 |
| 4,029,948 | 6/1977 | Hounsfield | 364/577 X |
| 4,044,240 | 8/1977 | Cox, Jr. et al. | 364/414 |
| 4,059,746 | 11/1977 | Hags | 364/723 X |
| 4,135,247 | 1/1979 | Gordon et al. | 364/414 |
| 4,136,388 | 1/1979 | Lindquist | 364/577 X |
| 4,144,570 | 3/1979 | Wagner | 364/414 |
| 4,149,249 | 4/1979 | Pavkovich | 364/414 |

Primary Examiner—Edward J. Wise
Attorney, Agent, or Firm—Finnegan, Henderson, Farabow, Garrett & Dunner

[57] ABSTRACT

Apparatus for calculating a plurality of interpolation values is adapted to calculate linear interpolation values, consisting of a second data train, from a first data train and includes a memory for storing the first data train and a calculator for calculating the interpolation value from the corresponding two data in the first data train read out of the memory. The calculator comprises an n-bit register for designating those addresses of the memory where data to be read out of the upper m-bit section of the n-bit register is stored and for determining weighted factor data for calculating the interpolation value at the lower (n-m) bit section of the register, a calculating unit for calculating the interpolation value from the data read out of the memory and the weighting coefficient data, an adder for adding a position increment value for designating the adjacent interpolation value to the register each time each interpolation value is calculated at the calculating unit, and a counter stepped one count for each calculation of each interpolation value and adapted to send an end signal to a central processing unit when a predetermined number of counts are completed. The memory, register, adder and counter are controlled by the central processing unit.

4 Claims, 6 Drawing Figures

APPARATUS FOR CALCULATING A PLURALITY OF INTERPOLATION VALUES

This invention relates to interpolation value calculating apparatus for obtaining a plurality of linear interpolation values, consisting of a second data train, from a first data train.

Where a first data train consisting of a plurality of data sampled at a predetermined sampling interval from analog data is converted to a second data train with a sampling interval different from that of the first data train, interpolation values need to be calculated using various interpolation methods. For example, where a first data train consisting of projected data $P_i$, $P_{i+1}$, $P_{i+2}$, $P_{i+3}$ ... with a sampling interval $d_1$ as shown in FIG. 1 is converted to a second data train consisting of data $P_K$, $P_{K+1}$, $P_{K+2}$, $P_{K+3}$ ..., $P_{K+1}$ data in the second data train can be given as a linear interpolation value as follows:

$$P_{K+1} = \alpha \cdot P_{i+2} + \beta \cdot P_{i+1} \quad (1)$$
$$(\alpha + \beta = 1)$$

where $\alpha$ and $\beta$ denote weighting coefficients.

Those data following the data $P_{K+1}$ are sequentially given an interpolation values to provide a second data train. As will be apparent from FIG. 1, the weighting coefficients $\alpha$ and $\beta$ are usually different for each interpolation value. Therefore, before calculation for obtaining an interpolation value is started, a separate calculations or a reference to a table beforehand prepared to obtain weighting coefficients for each interpolation value, is necessary thus taking lots of time in calculating interpolation values.

It is accordingly an object of this invention to provide apparatus for calculating a plurality of interpolation values which can obviate the need for calculating weighting coefficients data during the calculation of linear interpolating values and can effect high-speed calculation.

In order to achieve this object, this invention provides apparatus for calculating a plurality of interpolation values comprising a memory for sequentially storing a plurality of interpolation data of a first data train into corresponding addresses thereof and a calculator for calculating an interpolation value from those two data corresponding to two adjacent data points which are read out of the memory, the calculator comprising an n-bit register for designating addresses of the memory by an output signal determined by an upper m-bit section of a most significant part (MSP) of the register and reading out the two adjacent data from the addresses of the memory and for determining weighting coefficients data for obtaining the interpolation value by an output signal determined by a lower (n-m) bit section of a least significant part (LSP) of the register, the interpolation value being obtained at a position relatively determined between the two adjacent data points, a calculation unit for calculating the interpolation value from the output signal read out of the memory and an output signal from LSP of the register, a counter stepped one count each time each interpolation value is calculated by the calculation unit and adapted to reset the register to an initial data by a count output sent through a central processing unit (CPU) when a predetermined number of interpolation values are counted, and an adder for adding data corresponding to the sampling interval of a train of interpolation values to the register. The memory, register and adder are controlled by the CPU.

According to this invention, where a second data train consisting of data $P_K$, $P_{K+1}$, $P_{K+2}$ ... sampled with a sampling interval Xd is calculated as a series of interpolation values from a first data train consisting of interpolation data sampled with a sampling interval $d_1$, bit data corresponding to the sampling interval Xd is added to the register for each calculation of each interpolation value and, by so doing, weighting coefficients values for obtaining a succeeding interpolation value can be automatically obtained, permitting high-speed calculation of linear interpolation values.

This invention will be further described by way of example by referring to the accompanying drawings, in which.

One embodiment of this invention will be explained by referring to the accompanying drawings.

Figure 1:
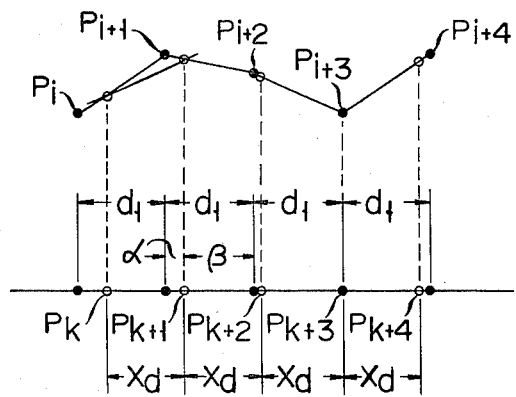
FIG. 1 is a view showing a train of data for explaining a linear interpolation method.
Figure 2:
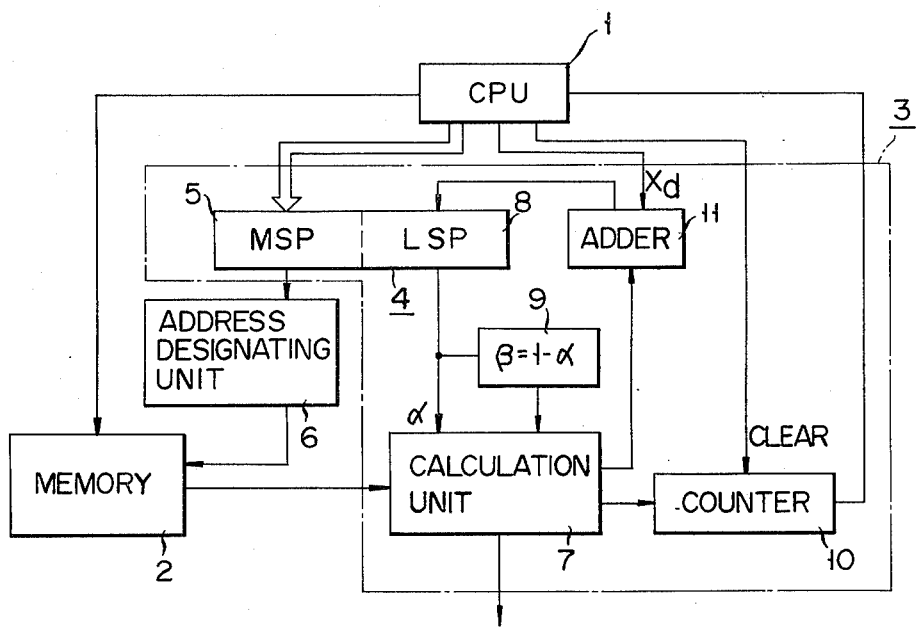
FIG. 2 is a block circuit diagram showing interpolation value calculating apparatus according to one embodiment of this invention.

As shown in FIG. 1, where data $p_i$, $P_{i+1}$, $P_{i+2}$ ... in a first data train have been obtained with a sampling interval $d_1$ and data $P_K$, $P_{K+1}$, $P_{K+2}$ ... in a second data train with a sampling interval Xd are calculated, as linear interpolation values, from the corresponding data points in the first data train, the data $P_i$, $P_{i+1}$, $P_{i+2}$ ... in the first data train are stored, by an instruction from CPU1, in the corresponding addresses of the memory 2, as shown in FIG. 2. When an interpolation value of the data $P_{K+1}$ in the second data train as shown, for example, in FIG. 1 is to be found, an output signal for designating an address corresponding to the data $P_{i+1}$ in the first data train is inputted from MSP (Most Significant Part) 5 of a register 4 of a calculator 3 into an address designating unit 6, and an address designating signal for designating the address corresponding to the data $P_{i+1}$ and $P_{i+2}$ is sent from the address designating unit 6 to the memory 2. When the address of the memory 2 is designated, the data $P_{i+1}$ and $P_{i+2}$ are read out of the memory 2 and delivered to a calculation unit 7. An output corresponding to a weighting coefficient $\alpha$ from LSP (Least Significant Part) 8 of the register 4 is supplied to the calculation unit 7, and an output corresponding to a coefficient $\beta = 1 - \alpha$ is also supplied through another calculation unit 9 to the calculation unit 7. The interpolation value $P_{K+1}$ corresponding to the data $P_{i+1}$ and $P_{i+2}$ in the first data train in calculated at the calculation unit 7, the calculation process of which is as follows:

$$P_{K+1} = \alpha \cdot P_{i+2} + \beta \cdot P_{i+1}$$

Upon completion of calculation, a complete signal is supplied as a count-up pulse to a counter 10.

The counter 10 is cleared from an instruction from CPU1 before a predetermined calculation is started, and incremented by one count each time a respective interpolation value $P_K$, $P_{K+1}$, $P_{K+2}$ ... in the second data train is calculated. After a predetermined number of interpolation value are counted, an initial value is delivered through CPU1 to the register 4 where it is set as an initial data. Each time the respective interpolation value is calculated by the calculation unit 7, a calculation completion signal is supplied as an add instruction signal to the adder 11.

Figure 3:
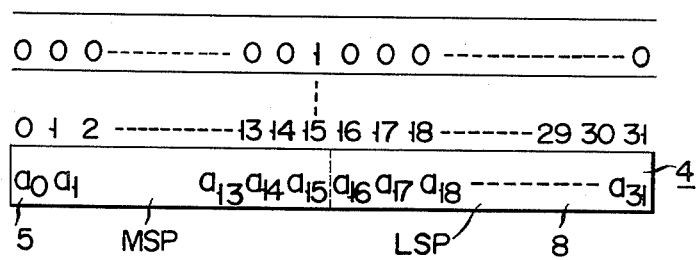
FIG. 3 is a view showing a bit configuration of a register of FIG. 2.

The register 4 has a capacity of 32 bits represented by $a_0$ to $a_{31}$ as shown in FIG. 3 and the sampling interval Xd of the interpolation value group is indicated in a binary mode. The sampling interval Xd can be relatively defined through the normalization of the sampling interval $d_1$ of the data in the first data train. For example, normalization is effected with the sampling interval $d_1$ represented by all binary "0" except for the 15th bit position represented by a binary "1". The 32-bit value is interpreted, via the normalization, as a binary "1" such that it corresponds to the sampling interval of the first data train. By so doing, the first data train, stored in the memory 2 is allowed to be accessed, via the address designating circuit 6 by the output of MSP 5 of the register 4. The output of MSP 5 of the register 4 designates, through the address designation circuit 6, a readout address which corresponds to the data in the first data train in the memory 2. LSP 8 of the register 4 is expressed in a binary code with a predetermined bit number and in this case as a weighting coefficient to the interpolation data $P_{K+1}$ and represents a distance $\alpha$ in FIG. 1 which corresponds to a distance from the data position of the data $P_{i+1}$ in the first data train to the interpolation data position $P_{K+1}$ i.e. a distance from the initial sampling interval $d_1$. If coincidence occurs between the to-be-interpolated data $P_{i+1}$ and the interpolated data, the weighting coefficient $\alpha$ becomes zero and all the bits of LSP 8 of register 4 indicate zero levels. When the interpolation value $P_{K+1}$ is found through calculation by the calculation unit 7, a calculation complete signal is supplied as an add instruction to the adder 11. At this time, the increment data Xd delivered by CPU1 is added by the adder 11 with the content of the register 4 and the adder output is then sent to the register 4. Carries may be effected to MSP 5 of the register 4 and the bit contents of MSP 5 of the register 4 shows a position of the data $P_{i+2}$ in the first data train which corresponds to the sampling interval $d_1$. The bit contents of MSP of the register 4 is supplied through the address designating circuit 6 to the memory 2 and data $P_{i+2}$ and data $P_{i+3}$ are read out from predetermined addresses of the memory 2. The calculation from unit 7 calculates these data read out from the memory 2, a new weighting coefficient $\alpha$ from the LSP 8 of the register 4 and another weighting coefficient $\beta$ to obtain an interpolation value $P_{K+2}$ in the second data train. The calculation complete signal is supplied to the counter 10 to cause the contents of the counter 10 to be counted up one step. An instruction for adding a value corresponding to the sampling interval Xd is also given to the adder 11. In this way, a plurality of interpolation values can be sequentially obtained. When a predetermined number of interpolation values are counted, the counter 10 supplies a complete signal to CPU 1 and the contents of the counter 10 is thus cleared. The contents of the register 4 is also cleared or reset to the initial value. As mentioned above, the first data train consisting of data sampled at a predetermined sampling interval is automatically converted through interpolation to a second data train with a sampling interval different from that of the first data train.

A tomographic apparatus incorporating such an interpolation value calculating apparatus will now be explained in more detail.

Figure 5:
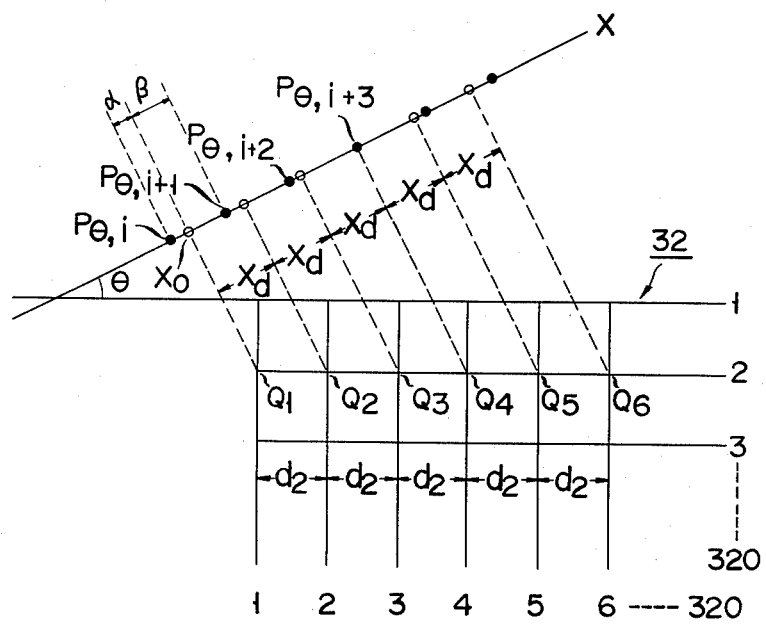
FIG. 5 is a view showing an image formed by a second data train calculated through interpolation from a first data train representative of an amount of radiation beams penetrated or absorbed in a subject to be examined, the image being obtained using the interpolation value calculating apparatus of FIG. 4.
Figure 4:
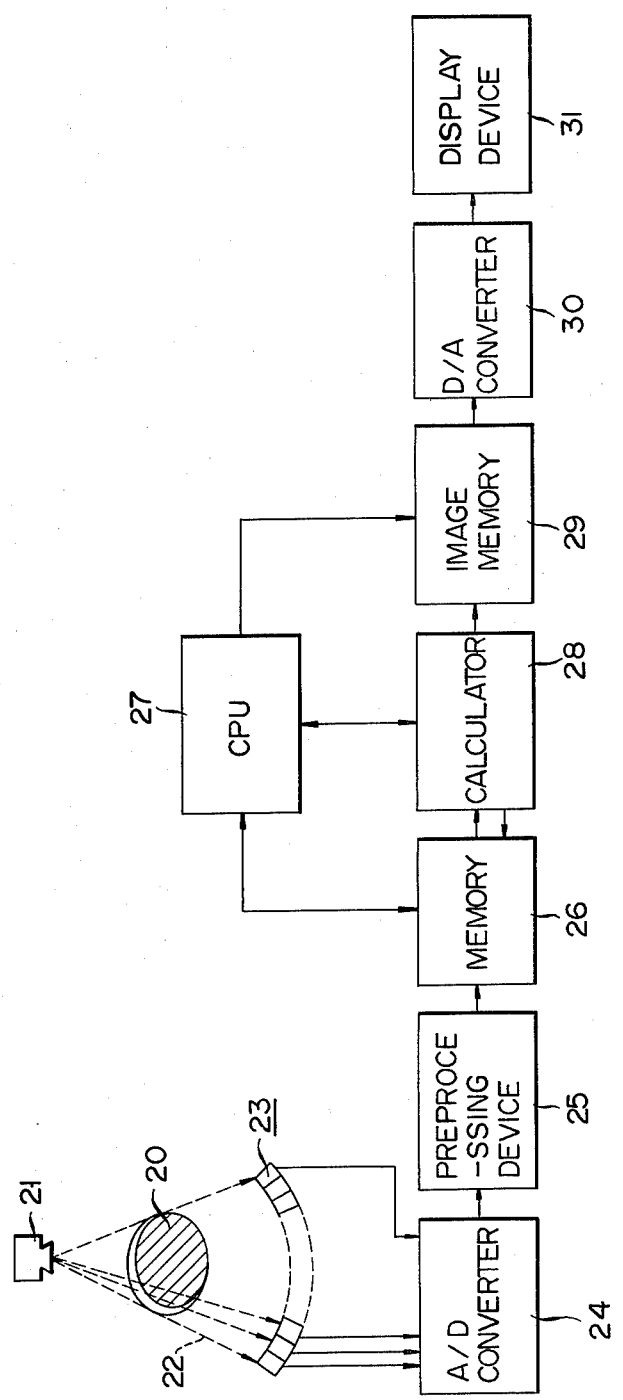
FIG. 4 is a block circuit diagram of the interpolation value calculating apparatus as applied to a tomographic apparatus.

A tomographic apparatus equipped with such a calculating apparatus is adapted to scan a patient by transmitting radiation beams at different incident angles through the predetermined portion of a patient and to reconstruct an image based on an amount of radiation beams penetrated or absorbed i.e. an image corresponding to a distribution of absorption factor data of the radiation beams which penetrate the predetermined portion of the patient. Radiation beams 22 from an X-ray source 21 are transmitted through the subject 20 as shown, for example, in FIG. 4 and the amount of penetrating radiation is detected at a detector array 23. The detector array 23 comprises, for example, 320 juxtaposed elements and detects amounts of radiation beams which penetrate through the subject 20. The X-ray source 21 and the detector array 23 can be rotated around the subject in order to scan at different directions. By so doing, the radiation beams penetrate the subject at a different angle so that the cross-sectional area of the subject can be accurately reconstructed. Even if the X-ray source 21 is rotated, the respective elements of the detector array 23 detect the corresponding parallel components of radiation beams as projection data. Electric signals of the projection data are converted by an A/D converter to a digital signal and supplied to a preprocessing device 25. The preprocessing device 25 converts the projection data expressed in an exponential function to a logarithmic form and performs some normalizations and then sends the projection data to a predetermined address of the memory 26. The projection data stored in the memory 26 is sent to a CPU 27 consisting of, for example, a minicomputer where a filtering operation is effected to obtain a set of modified projection data. The modified projection data is stored back into the memory 26, and sent to a calculator 28 where a back-projection calculation is carried out. The back-projection calculation is effected to cause the modified projection data to be placed on a crosspoint corresponding to a respective picture element of a mesh pattern on which a reconstructed cross-sectional image is represented, but this does not necessarily mean that the modified projection data is present in the corresponding cross-point. For this reason, a linear interpolation value is calculated using the modified projection data corresponding to the cross-point. It is necessary in this case to make the linear interpolation value a modified projection data value at the cross-point corresponding to the picture element of the mesh pattern. This situation can be explained by referring to FIG. 5. A mesh pattern 32 on which the reconstructed pattern is to be represented has cross-points of 320×320 which correspond to the respective picture elements. The modified projection data is represented by black dots $P_{\theta,i}$, $P_{\theta,i+1}$, $P_{\theta,i+2}$, $P_{\theta,i+3}$ ... on an X-line formed at an angle of $\theta$ with respect to a horizontal line of the mesh pattern i.e. a line corresponding to the second data train formed by the linear interpolation values. Perpendiculars are drawn from the cross-points $Q_1$, $Q_2$, $Q_3$ ... on a line 2 of the mesh pattern 32 down onto the X-line to provide white dots on the X-line. Suppose that the spacing of the adjacent cross-points on the mesh pattern 32 is indicated by $d_2$ and that the spacing of the adjacent white dots on the X-line is indicated by Xd. In this case, a series of interpolation values with an initial value $X_0$ and a sampling interval $Xd = d_2 \cos \theta$ is obtained with respect to the respective positions. At this time, the foot position of the perpendicular can be expressed by:

$$X = X_0 + n \cdot d_2 \cos \theta \quad (3)$$

where $n = 0 \sim 319$.

Figure 6:
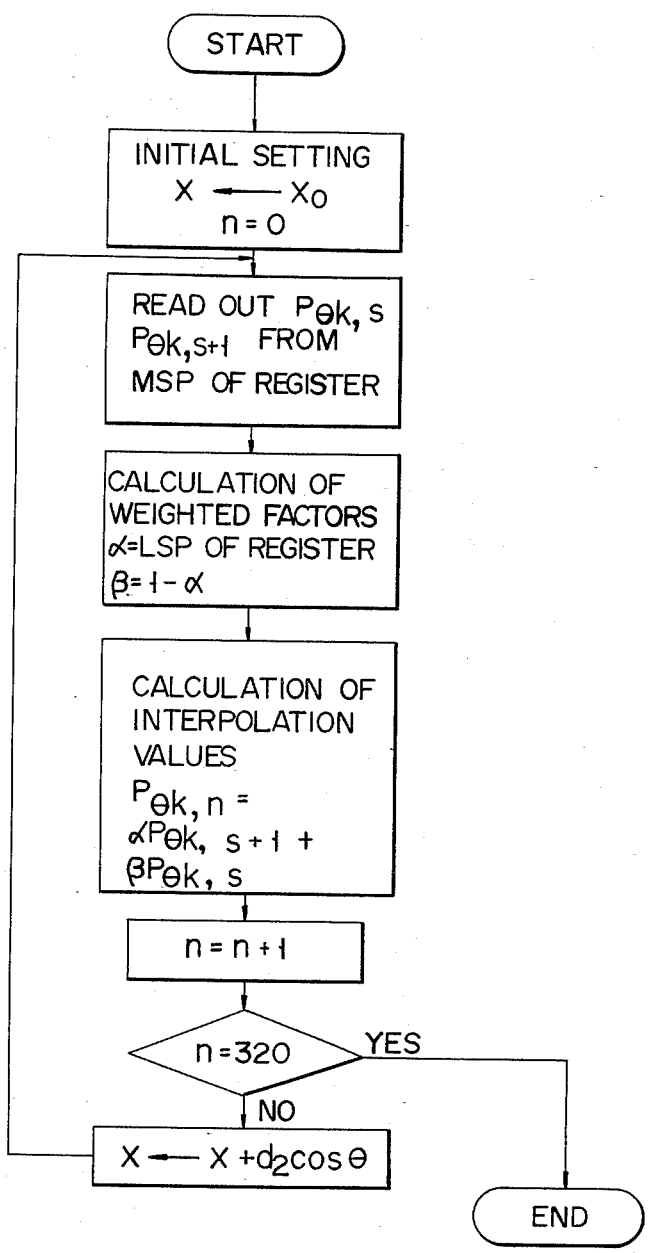
FIG. 6 is a flow chart showing operation of the device shown in FIG. 2.

A linear interpolation value corresponding to the foot position of the perpendicular as indicated by the white dots can be expressed as follows:

$$P_{\theta K, n} = \alpha \cdot P_{\theta K, s+1} + \beta \cdot P_{\theta K, s} \quad (4)$$

where S is an index determined by n and $\theta K$ is an indexed angle position. In this way, the linear interpolation values found through interpolation are back-projected on the cross-points $Q_1, Q_2, Q_3 \ldots$ on the mesh pattern 32, resulting in a second data train with the sampling interval Xd. The interpolation calculation is effected by the calculation unit shown in FIG. 2, the flow chart of which is shown in FIG. 6.

At the start time, the register 4 is shown in FIG. 2 is set to an initial value. In this case, the position $X_0$ on the X-line corresponding to the food position of the perpendicular drawn from the leftmost end $Q_1$ of the mesh pattern 32 is used as the initial value. At this time, $n = 0$. An output of a bit configuration corresponding to the initial value $X_0$ is produced from MSP 5 of the register 4 and it is supplied to the address designating circuit 6. The address designating circuit 6 designates addresses in the memory 2 which correspond to data $P_{\theta,i}$ and $P_{\theta,i+1}$, in the case of FIG. 5 on the black dots on the X-line. The data $P_{\theta,i+1}$ and $P_{\theta,i+2}$ are read out of the corresponding addresses of the memory 2. LSP 8 of the register 4 indicates in a binary-coded form a distance $\alpha$ from the data position $P_{\theta,i}$ on the X-line of FIG. 5 to the foot position on the X-line of a perpendicular drawn from the cross-point $Q_1$ in the mesh pattern, provided that the position of the data $P_{\theta,i}$ on the X-line i.e. the MSP (see FIG. 3) of the register 4 indicates binary "1". Thus $\alpha$ indicates a weighting coefficient. The weighting coefficient $\alpha$ is supplied directly to the calculation unit 7. Another weighting coefficient $\beta$ is obtained through a calculation of $\beta = 1 - \alpha$ by the calculation unit 9 and supplied to the calculation unit 7. At the calculation unit 7 a calculation as shown in Equation (4) is carried out to obtain an interpolation value. Each time a calculation is completed, a complete signal is supplied to the counter 10, causing the latter to be stepped to permit the cross-points on a predetermined line on the mesh pattern 32 to be counted in a sequential fashion. The output of unit 7 is also supplied to the adder 11, the output of which is added to the register 4 such that the bit number corresponding to the sampling interval Xd is indicated in a binary-coded form. When the output of the counter 10 indicates n(=320) times, an end instruction is supplied from the counter 10 to CPU 1 and MSP 5 of the register 4 is reset by CPU 1 to the next mesh line initial data $X_0$, $Q_K$. In this way, interpolation values on the cross-points on each line of the mesh pattern 32 are sequentially obtained.

The interpolation values obtained at the calculator 28 are sent to an image memory 29 where an original image is reconstructed. The outputs of the image memory 29 are, after conversion by a digital-analog converter 30 to analog data, supplied to a display device 31 for display. The image memory 29 can be formed in a single unit, but may be omitted if part of the memory 26 is used as such. Also the register 4 can be an internal register of a computer in CPU 27.

This invention is not restricted to the abovementioned embodiment and can be readily applied to apparatus for calculating interpolation values when a first data train indicated by analog amounts sampled with a predetermined sampling interval or discrete sample data in nature is converted to a second data train with a sampling interval different from that of the first data train.

What we claim is:

1. Apparatus for calculating a plurality of interpolation values $I_1, I_2, I_3 \ldots I_n$ from corresponding values in a data train $D_1, D_2, D_3, \ldots D_n$, said apparatus comprising:
   a memory for sequentially storing said values in said data train;
   a calculator for calculating an interpolation value $I_j$ from two values in said data train $D_j$, $D_{j+1}$ stored in said memory, said calculator comprising:
   an N-bit register having an upper M-bit portion for designating the addresses of said two values $D_j$, $D_{j+1}$ stored in said memory and a lower (N-M) bit portion for providing weighting coefficient data; and
   a calculation unit for calculating the interpolation value $I_j$ from said two values $D_j$, $D_{j+1}$ and said weighting coefficient data;
   a counter incremented by a constant value each time a said interpolation value $I_j$ is calculated by said calculation unit, said counter for generating an end signal after a predetermined number of interpolation values have been counted;
   an adder for adding the value corresponding to a sampling interval for the interpolation values $I_j$ to said N-bit register each time an interpolation value is calculated by said calculation unit; and
   a central processing unit coupled to said memory, said N-bit register, said adder, and said counter (1) supplying a value to said upper portion of said N-bit register corresponding to an address of a value $D_j$ stored in said memory, (2) supplying the initial weighting coefficient data to said lower portion of said N-bit register, (3) providing said value corresponding to a sampling interval to said adder, and (4) supplying a clear instruction signal to said counter responsive to said end signal for clearing said counter.

2. An apparatus according to claim 1 wherein said weighting coefficient data stored in said lower portion of said N-bit register corresponds to $\alpha$ and wherein said apparatus further includes a second calculating unit coupled to said lower portion of said N-bit register and to said calculation unit for calculating a second weighting coefficient $\beta$ having a value equal to $1 - \alpha$.

3. An apparatus according to claim 1, wherein said data train has a sampling interval equal to $D_2$ and corresponding to the different between a value $D_{j+1} - D_j$, and wherein said central processing unit supplies to said adder said sampling interval $D_2$ and angle data $\theta_i$ equal to the ange between corresponding interpolation values $I_j$ and data values $D_j$, said sampling interval added by said adder to said N-bit register being equal to $X_D - D_2 \cos \theta$.

4. A tomographic apparatus for displaying an image of a subject scanned by radiation by generating a plurality of interpolation values $I_j - I_1, I_2, \ldots I_n$ from a plurality of data values $D_j - D_1, D_2 \ldots D_n$ in a data train, said tomographic apparatus comprising:

means for generating radiation beams in a predetermined pattern such that radiation beam scans of said subject can be effected in different directions;

means for detecting the direction and intensity of radiation beams penetrating said subject;

means for converting to projection data parallel components of said detected radiation beams;

memory means for storing said projection data as said data values $D_j$ in sequential memory storage positions;

means for calculating said interpolation values $I_j$ from said data values $D_j$ to reconstruct an image corresponding to a distribution of absorption factor data of said radiation beams in cross-sectional areas of said subject, said calculating means comprising (1) an N-bit register having an upper M-bit portion for addressing said data values $D_j$ stored in said memory means, and a lower (N-M) bit portion for generating weighting coefficient data to obtain an interpolation value $I_j$ from two sequential data values $D_j$, $D_{j+1}$ stored in said memory means, and (2) a calculator unit for computing an interpolation value $I_j$ from said addressed two sequential data values $D_j$, $D_{j+1}$ and said weighting coefficient data;

a counter incremented by a fixed value each time an interpolation value is computed by said calculating unit, said counter for generating an end signal after a predetermined number of interpolation values have been computed;

an adder for incrementing said lower portion of said N-bit register by an amount equal to a sampling interval for said interpolated data each time an interpolation value is computed;

a central processing unit coupled to said memory means, said N-bit register, said adder, and said counter for (1) controlling the storing of said projection data in said memory means, (2) supplying the initial address of a said projection data $D_j$ in said memory means to said higher bit portion of said N-bit register, (3) supplying the initial weighting coefficient data to said lower bit portion of said N-bit register, and (4) clearing said counter in response to said end signal;

image memory means for storing said computed interpolation values;

means for converting said interpolation values stored in said image memory means to corresponding analog values; and means controlled by said analog values for displaying an image of said subject scanned by said radiation beams.

* * * * *